Patented Dec. 25, 1945

2,391,740

UNITED STATES PATENT OFFICE 2,391,740

SENSITIZATION OF HYDROGEN BROMIDE CATALYZED OXIDATION REACTIONS

John H. Raley and Frederick F. Rust, Berkeley, Calif., assignors to Shell Development Company, San Francisco, Calif., a corporation of Delaware No Drawing. Application January 17, 1944, Serial No. 518,665

11 Claims. (Cl. 260—533)

This invention relates to the controlled non-explosive oxidation of organic compounds containing one or more replaceable hydrogen atoms. In one of its more specific embodiments it pertains to an improved process for effecting the catalytic oxidation of such organic compounds to produce high yields of carboxylic acids, alcohols, ketones and/or organic peroxides having either the same or twice the number of carbon atoms per molecule as the primary starting material treated.

It has been previously discovered that carboxylic acids, ketones and/or organic peroxides may be produced by subjecting organic compounds having at least one replaceable hydrogen atom to a partial and controlled oxidation in the presence of hydrogen bromide, which catalyzes and controls the reaction. More specifically stated, it has been discovered that the above-mentioned and hereinbelow more fully described organic compounds may be subjected to a controlled, non-explosive oxidation in the presence of a catalyst consisting of hydrogen bromide to produce high yields of desirable carboxylic acids, organic peroxides and/or ketones containing at least the same number of carbon atoms per molecule as the starting organic material thus subjected to the oxidation. For instance, U. S. patent application, Serial No. 474,220, filed January 30, 1943, discloses and claims a process for the controlled partial and non-explosive oxidation of aliphatic and particularly saturated aliphatic hydrocarbons and of their products of partial halogenation, to produce carboxylic acids and/or ketones having the same number of carbon atoms per molecule as the starting material treated. In accordance with the process disclosed and claimed in said application, this oxidation is effected by subjecting the saturated organic materials, such as ethane, propane and butane, as well as their products of halo-substitution, to the action of oxygen at an elevated temperature which is, however, below that at which spontaneous combustion occurs, this oxidation being effected in the presence of a catalyst comprising or consisting of hydrogen bromide. Also, U. S. patent application, Serial No. 474,221, filed January 30, 1943, covers a process for the controlled, non-explosive oxidation of aromatic hydrocarbons and particularly of alkylated aromatic hydrocarbons to produce phenol, substituted phenols, aromatic carboxylic acids, organic peroxides, and/or ketones having the same number of carbon atoms per molecule as the starting material, this oxidation being effected by subjecting the mentioned aryl or aralkyl hydrocarbons or their partially halogenated derivatives to the action of oxygen at an elevated temperature which is preferably above about 100° C., but below the temperature capable of causing spontaneous combination, and in the presence of hydrogen bromide employed as the catalyst. U. S. patent application, Serial No. 474,221, discloses and claims a similar process for the production of predetermined oxygenated products by the controlled catalytic oxidation, under non-explosive conditions, of alicyclic hydrocarbons and of their halogented derivatives, while U. S. patent application, Serial No. 474,224, filed January 30, 1943, covers a process for the production of novel organic peroxides and organic hydroperoxides by the controlled oxidation of isoparaffins such as isobutane. Similarly, U. S. patent application, Serial No. 480,862, filed March 27, 1943, is directed to the production of certain unsaturated carboxylic acids and/or ketones by the controlled hydrogen bromide catalyzed oxidation, under non-explosive conditions, of unsaturated organic compounds such as unsaturated aliphatic hydrocarbons, while U. S. patent application, Serial No. 486,458, filed May 10, 1943, covers a process for the production of unsubstituted and halo-substituted unsaturated carboxylic acids by the controlled oxidation of halogenated unsaturated hydrocarbons. In all of these cases the controlled oxidation is effected in the presence of a catalyst consisting of or comprising hydrogen bromide which, as stated, may be introduced as such into the reaction zone or formed in situ under the operating conditions employed.

The above-outlined inventions are predicated on the discovery that the presence of hydrogen bromide during the catalytic oxidation of the above-mentioned and hereinbelow more fully described organic compounds controls the oxidation reaction so that the oxidation occurs on the carbon atom or atoms to which a halogen atom, such as bromine atom, would normally attach itself if the starting material were subjected to a halo-substitution reaction. Also, it appears that the presence of the hydrogen bromide, besides retarding the explosion or complete combustion of the organic starting material, has the effect of inhibiting the decomposition of the carbon structure of the starting organic material so that the resultant oxygenated compound or compounds contain the same number of carbon atoms per molecule as the starting organic material or, as in the case of certain organic peroxides such as those formed during the controlled catalytic oxidation of isoparaffins, contain twice the number of carbon atoms per molecule present in the starting material treated.

It has now been discovered that the catalytic non-explosive oxidation of organic compounds, and particularly of the group of organic compounds described more fully hereinbelow, may be realized more effectively by subjecting these organic starting materials under the defined temperature and pressure conditions to the action of oxygen in the presence of hydrogen bromide and of relatively small amounts of certain substances which apparently act as sensitizers. The use of these substances during the catalytic oxidation of the organic materials in the presence of hydrogen bromide greatly increases the yield of the desired oxygenated products, reduces the concentration of the hydrogen bromide necessary for effecting the desired reaction, and increases the rate of conversion even in the cases where the reaction is effected at temperatures considerably below those necessary for the similar controlled catalytic oxidations, which are effected in the absence of these sensitizing materials. Additionally, the presence of the sensitizers permits the effecting of the hydrogen bromide catalyzed oxidation reactions at temperatures at which explosions would normally occur but for the presence of these sensitizing materials. Still another advantage of the present process resides in the fact that economical yields of the desired oxygenated products may be obtained with hydrogen bromide concentrations materially below those necessary when no sensitizer is employed, this decrease in the hydrogen bromide concentration being considerably greater than the amount of sensitizer necessary for such lowering of the hydrogen bromide concentration. The use of the hereinabove mentioned and hereinbelow more fully described class of sensitizers also permits the controlled oxidation at temperatures which are insufficient to effect the production of the desired oxygenated products during controlled oxidations when no sensitizer is used. Also, the addition of the sensitizer greatly increases the yield of the desired products, this increase being considerably greater than that obtainable by an equivalent increase in the hydrogen bromide concentration.

The present process is applicable to the oxidation of all organic compounds which contain at least one replaceable hydrogen atom, the process being effective for the controlled oxidation of aliphatic hydrocarbons, particularly saturated aliphatic hydrocarbons, as well as of aromatic hydrocarbons, alkylated aromatic hydrocarbons, alicyclic hydrocarbons, which may or may not contain one or more saturated or unsaturated aliphatic side-chains, as well as of their derivatives such as the products of their partial halo-substitution. Also, various other organic derivatives, e. g. nitriles, ketones, etc. fall within the class of organic compounds that may be employed as the starting material. For example, methyl ethyl ketone may be readily oxidized according to the present process to produce diacetyl. A particularly suitable class of organic compounds that may be subjected to the hydrogen bromide catalyzed controlled oxidation in the presence of the sensitizers of the present invention comprise the straight-chain organic compounds as well as other organic compounds the oxidation of which is difficult and thus ordinarily requires comparatively rigorous conditions. Cyclohexane is a typical example of such organic compounds. Another group includes compounds of the type of ethyl benzene which, when oxidized in accordance with the process of the present invention, produces acetophenone. As pointed out above, the use of the sensitizers permits the oxidation with hydrogen bromide concentrations and temperatures considerably lower than those essential for the controlled oxidation in the absence of sensitizers. Such treatment decreases the undesirable side reactions of the type of ketone condensation reactions.

Representative organic compounds of the class that may be oxidized in accordance with the process of the invention include the straight-chain and branched-chain saturated aliphatic hydrocarbons such as ethane, propane, butanes, pentanes, hexanes, heptanes, octanes and the like; the alicyclic hydrocarbons such as cycloparaffin, cyclobutane, cyclopentane, cyclohexane, the higher homologues thereof; and the alkylated cycloparaffins such as methyl cyclopentane, methyl cyclohexane, and the like; aryl and aralkyl hydrocarbons such as naphthalene, toluene, xylenes, ethyl benzene, n-propyl benzene, butylbenzenes, and the like; the partially halo-substituted derivatives of the above-mentioned and similar hydrocarbons such as ethyl chloride, dichloroethane, dibrompropanes, monochlorbutanes, monobrombutanes, dichlorbutanes, monochlorcyclopentane, benzyl chloride, benzyl bromide, and their homologues and analogues. Also, the corresponding unsaturated hydrocarbons and halogenated derivatives thereof are included together with other derivatives of the above-defined class of hydrocarbons. As mentioned, the straight-chain aliphatic hydrocarbons, as well as compounds of the type of cyclohexane, ethyl benzene, and the like, are compounds especially suitable as the starting material in the controlled oxidation reaction effected in accordance with the process of the present invention.

Generally speaking, the class of sensitizers to be employed as promoting agents in the hydrogen bromide catalyzed controlled oxidation of the organic compounds of the class defined hereinabove comprises compounds which are in the form of free radicals or which yield free radicals under the oxidation conditions employed.

The term "free radical," as employed herein, refers to an organic compound in which all of the valences are not satisfied (see: Hackh's Chemical Dictionary, 2nd. ed., page 397). These free radicals are electrically neutral molecules possessing one unpaired electron and exhibiting an unsaturated behavior. These properties distinguish these free radicals from ions (such as those obtained by ionization of certain salts or in electric discharge of gases).

Representative compounds which exist in the form of free radicals are the substances containing trivalent carbon, as triarylmethyls of the type of triphenyl methyl, and trialkylmethyls of the type of triethyl methyl, compounds which contain bivalent and quadrivalent nitrogen, compounds containing univalent oxygen or sulfur, and the like. A more complete list of such organic free radical compounds is to be found in the 1938 edition of "Organic Chemistry—an Advanced Treatise," by H. Gilman and others, vol. I, pages 489–541, as well as in "The Aliphatic Free Radicals," by F. O. Rice et al.

It was stated above that the sensitizers comprise not only the compounds which exist in the form of free radicals, but also include organic compounds which yield or form free radicals under the operating conditions. A large number of organic compounds will readily form or yield free radicals of themselves by thermal decomposition when subjected to the elevated temperatures necessary for the effecting of the slow, i. e. non-explosive, hydrogen bromide catalyzed oxidation reaction. Another suitable group of compounds includes those which, when subjected to hydrogen bromide catalyzed oxidation, presumably yield intermediate compounds—not radicals or peroxides—which intermediate compounds will undergo decomposition under operating conditions to yield free radicals. For instance, the halides of the straight-chain paraffins, and particularly the bromides of the lower homologues of this series of hydrocarbons, e. g. ethyl bromide, n-propyl bromide, and the like, have been found to be highly effective sensitizers for the promotion of the mentioned hydrogen bromide catalyzed oxidation reaction. In accordance with the postulated theory, although there is no intention of being limited thereby, during the catalytic oxidation of, for example, ethane in the presence of ethyl bromide as the sensitizer, the intermediate compound obtained from the ethyl bromide is acetyl bromide which under the operating conditions breaks down to give, among other things, methyl radicals. These sensitize the hydrogen bromide catalyzed oxidations.

The amount of the sensitizer to be employed will vary within relatively wide limits, although optimum amounts or percentages may be readily determined for each individual case. Generally speaking, the concentration of the sensitizer will vary from a small fraction of 1%, e. g. about 0.1% or less, to about 4% or 5% or more, as calculated on the volume of the reactants introduced into the reaction zone, satisfactory results having been obtained when the sensitizer concentration was in the neighborhood of about 1% by volume. The optimum amount of the sensitizer to be used will depend on a number of variables such as the particular organic material treated, the hydrogen bromide concentration, the specific temperature employed, etc. The use of a given amount of the sensitizer in lieu of the same amount of hydrogen bromide will materially improve the yield of the desired oxygenated products. However, it is still necessary to use the hydrogen bromide which apparently acts as the catalyst. Therefore, an increase in the sensitizer concentration will permit the reduction in the hydrogen bromide concentration only to a certain minimum, which is apparently above the amount of hydrogen bromide which, under equilibrium conditions in the operating zone, reacts with the organic starting material to produce alkyl bromides. In order to obtain optimum yields, it is preferred to correlate the hydrogen bromide and sensitizer concentrations.

It was stated above that the slow or non-explosive controlled oxidation of the above-outlined class of organic compounds, when effected in the presence of hydrogen bromide, is realized at temperatures below those at which spontaneous combustion or substantial decomposition of the carbon structure occurs. It was also stated that the presence of the sensitizers, at least in some cases, permits the use of relatively lower reaction temperatures, while at the same time attaining the same or greater yields of the desired oxygenated products as compared with those obtained when the reaction is effected in the presence of hydrogen bromide but in the absence of the sensitizer. The upper temperature limit will depend on the specific organic substance to be oxidized, the proportions of the organic substances, oxygen, hydrogen bromide, and sensitizer present in the mixture subjected to the elevated temperatures. Generally speaking, this upper temperature limit is in the neighborhood of about 225° C., although some of the more stable organic compounds of the defined class may be heated to even higher temperatures, e. g. about 250° C., particularly when the reaction is effected in the presence of relatively larger concentrations of the sensitizer and of inert diluents, such heating failing to cause the mixture to decompose to carbon and other undesirable products of decomposition. In this connection it must be noted that excessively high temperatures, even though they are below the explosive region, should be avoided because of certain undesirable side reactions, such as the reaction of the hydrogen bromide with the organic compounds and oxygen to form the corresponding organic bromides. Although the upper temperature limit was mentioned to be in the neighborhood of about 225° C., this temperature may be raised above this limit, particularly when shorter contact periods, relatively more stable compounds, and/or higher concentrations of the sensitizer are employed. On the other hand, some of the more readily oxidizable compounds may be economically oxidized according to the present process at lower temperatures, such as between about 150° C. and about 175° C., particularly when the reaction is effected with relatively larger percentages of the more active of the above-mentioned sensitizers. Other conditions being equal, a further decrease in the operating temperature generally decreases the output of the product per unit of time, so that at temperatures materially below about 100° C. the controlled oxidation in the presence of hydrogen bromide and of the above-mentioned sensitizers may become uneconomical.

Although the volumetric ratios of the organic starting material to the oxygen may vary within relatively wide limits, satisfactory yields of the desired oxygenated product or products can be obtained by using equivolumetric quantities thereof. As to the amount of hydrogen bromide to be employed as the catalyst, this amount also may vary, although optimum amounts or percentages which may be readily determined for each case will depend on a number of variables. Thus, it has been stated that an increase in the concentration of the sensitizer in the reaction mixture, other conditions being equal, will permit a decrease in the hydrogen bromide concentration. When the reaction is effected in the presence of the sensitizers, the hydrogen bromide concentration may be considerably below the 20% which has been set in the previously mentioned patent applications as constituting the approximate upper limit.

The oxidation in accordance with the present process may be effected at atmospheric pressure, although higher or lower pressures may also be employed. Generally, it is preferable to use superatmospheric pressures because more of the mixture subjected to treatment may be conveyed through a given unit of reaction space per unit of time.

The oxidation reaction may be effected in the liquid or vapor phase or in a two-phase liquid-vapor system. Since it is difficult to maintain a desirable relatively high oxygen concentration when the reaction is conducted in the liquid phase, it is generally preferable to effect the reaction in accordance with the process of the present invention in the vapor phase. Some of the higher-boiling organic compounds cannot be effectively maintained in the vapor state and in contact with sufficient concentrations of oxygen and hydrogen bromide without causing the spontaneous combustion of such a mixture. The oxidation of these organic compounds may be readily effected in the presence of an inert diluent or carrier such as steam, nitrogen, carbon dioxide and even methane, which latter is relatively stable at the temperatures at which the above-mentioned organic compounds may be oxidized in accordance with the process of the present invention.

The invention may be executed in a batch, intermittent or continuous manner. When operating in a continuous system, all of the organic compound, oxygen, hydrogen bromide and sensitizer, as well as the diluent if such is used, may be first mixed and the mixture thus formed may then be conveyed through the whole length of the reaction zone. In the alternative, it is possible to introduce at least a portion of the sensitizer, hydrogen bromide catalyst and/or one or both of the reactants, i. e. oxygen and the organic material subjected to oxidation, at various intermediate points along the reaction zone. Such operation may be frequently desirable to control the operating conditions in the reaction zone and also to increase the yield of the desired products. For instance, stage injection of even minor amounts of the sensitizers of the above class at various intermediate points along the length of the reaction zone materially increases the overall yield of desired products of oxidation. The contact time may vary within rather wide limits and at least in part depend on the type and amount of the various compounds conveyed through the reaction zone, as well as on the other operating conditions. Generally, in a continuous system, it has been found that satisfactory yields of the desired carboxylic acids, organic peroxides and/or ketones (which latter term refers to organic compounds having one or more ketonic carbonyl groups) may be obtained with contact periods of between about 1 minute and about 3 minutes, although shorter or longer contact times may also be employed.

The following examples will illustrate the process of the present invention and the advantages and benefits derived from employing the mentioned sensitizers for the hydrogen bromide catalyzed controlled oxidation of organic compounds. It is to be understood, however, that there is no intention to be limited by any details set forth in these examples.

Example I

The reactor consisted of a glass coil having an internal diameter of 25 mm. This coil had a volume equal to 2980 cc., and was immersed in an oil bath which permitted accurate control of the reaction temperature. A preheated gaseous mixture of propane, oxygen and hydrogen bromide, which substances were used in a volumetric ratio of 2:2:1, was conveyed at substantially atmospheric pressure through the coil at such a rate that the residence time was about 3 minutes. The reaction temperature was maintained at about 186° C. It was found that under these conditions about 73% of the introduced oxygen reacted to form oxygenated products predominating in acetone.

Example II

This run was identical with that described in the previous example, with the exception that approximately 12.5% of the introduced propane was substituted by n-propyl bromide, the concentration of this sensitizer being thus equal to about 5% by volume of the total vapors conveyed through the reaction zone. The presence of this sensitizer increased the oxygen consumption so that about 82% of the introduced oxygen reacted to form the desired oxygenated products.

Example III

A gaseous mixture consisting of 2 parts by volume of propane, 2 parts by volume of oxygen, and 1 part by volume of hydrogen bromide was conveyed through the same reactor as that used in the above described runs. The residence time was about 1.5 minutes, the reaction temperature being maintained at about 186° C. It was found that under these conditions only about 30% of the introduced oxygen reacted to form oxygenated products.

Example IV

The run described in the previous example was repeated except that n-propyl bromide was substituted for about 12.5% of the introduced propane. The concentration of this sensitizer was thus equal to about 5% by volume of the gaseous mixture treated. It was found that the presence of this sensitizer, namely n-propyl bromide, nearly doubled the oxygen consumption, the amount of oxygen reacting to form the desired oxygenated products being equal to about 60%.

Example V

This run was conducted in the same reactor as that employed in the above runs. A vaporous mixture of ethane, oxygen and hydrogen bromide was conveyed through the reactor at such a rate that 240 cc. per minute of ethane, 240 cc. per minute of oxygen, and 120 cc. per minute of hydrogen bromide were introduced into the reactor. The residence time was equal to about 3 minutes, the reaction temperature being maintained at about 220° C. Approximately 59% of the introduced oxygen was found to have reacted and approximately 59.6 cc. per minute of carboxylic acid were produced.

Example VI

Ethane, oxygen, hydrogen bromide and ethyl bromide were conveyed through the above reactor at the following rates: 220 cc. per minute of ethane, 240 cc. per minute of oxygen, 100 cc. per minute of hydrogen bromide, and 26 cc. per minute of ethyl bromide. The contact time was about 3 minutes, the reaction temperature being maintained at about 216° C. In spite of the lower reaction temperature and lower catalyst concentration (as compared to those in the preceding example), the oxygen consumption rose from 59% to 82%, the yield of carboxylic acid being 79.3 cc. per minute instead of 59.6 cc. per minute.

In all of the above runs the quantities of the reactants, catalyst and sensitizer, as well as the yields, are given in volumes of vapor.

Example VII

A preheated vaporous mixture of cyclopentane, oxygen and hydrogen bromide, which substances are used in a volumetric ratio of 5:5:1, together with ethyl bromide employed in an amount equal to about 5% by volume of the total vaporous mixture, is conveyed at substantially atmospheric pressure through a reactor of the type described above. By maintaining the reaction temperature at about 185° C. and with a residence time of about 3 minutes, the cyclopentane is oxidized to cyclopentanone. The use of the sensitizer permits a materially lower hydrogen bromide concentration, thus lessening the tendency of the ketone to condense.

*Example VIII*

A vaporous mixture of toluene, oxygen and hydrogen bromide employed in a volumetric ratio of 2:2:1, which mixture also contains n-propyl bromide in an amount equal to about 5% by volume of the total vaporous mixture, is conveyed through the above-mentioned reactor maintained at a temperature of about 200° C., the residence time being about 3 minutes. The presence of the sensitizer materially increases the consumption of the introduced oxygen to produce desired oxygenated products, including benzoic acid.

Advantages comparable to those shown above are also obtainable when other compounds which exist as, or which yield, free radicals are employed in lieu of the ethyl bromide or the n-propyl bromide used as the sensitizers in the above examples. For instance, the addition of triethyl methyl in an amount of about 5% by volume of the vaporous mixture, other conditions being equal, will materially increase oxygen consumption and, therefore, the production of the desired oxygenated products, as compared to those attainable when the oxidation of, for example, propane is effected in the presence of hydrogen bromide, but in the absence of any sensitizer. Also, further increase in yields is attained when additional amounts of the sensitizer are added at intermediate points along the path of the reactants through the reaction zone.

We claim as our invention:

1. In a process for the controlled oxidation of propane to produce desirable oxygenated products including acetone, in which process substantially equivolumetric amounts of propane and oxygen are subjected, at a temperature of between about 100° C. and about 225° C., to the action of hydrogen bromide employed in an amount not in excess of about 20 mol percent, the improvement which comprises effecting this reaction in the presence of between about 0.1% and about 5%, by volume of the total mixture, of n-propyl bromide, and correlating the concentration of the hydrogen bromide with the concentration of the n-propyl bromide and the reaction temperature to produce the desired oxygenated products while avoiding spontaneous combustion.

2. In a process for the controlled oxidation of ethane to produce acetic acid, in which process substantially equivolumetric amounts of ethane and oxygen are subjected, at a temperature of between about 100° C. and about 225° C., to the action of hydrogen bromide employed in an amount not in excess of about 20 mol percent, the improvement which comprises effecting this reaction in the presence of between about 0.1% and about 5% by volume of ethyl bromide, and correlating the concentration of the hydrogen bromide with the concentration of the ethyl bromide and the reaction temperature, to produce acetic acid while avoiding spontaneous combustion.

3. In a process for the production of desirable oxygenated products, in which process propane and oxygen are subjected, at a temperature of between about 100° C. and about 225° C., to the action of hydrogen bromide, the improvement which comprises effecting the reaction in the presence of between about 0.1% and about 5% by volume of n-propyl bromide.

4. In a process for the production of acetic acid wherein ethane and oxygen are reacted in the presence of hydrogen bromide, at a temperature of between about 100° C. and about 225° C., the improvement which comprises effecting the reaction in the presence of between about 0.1% and about 5% by volume of ethyl bromide.

5. In a process for the production of desirable oxygenated products, the steps of subjecting vapors of a saturated aliphatic hydrocarbon having at least two carbon atoms per molecule to the action of oxygen in the presence of hydrogen bromide and between about 0.1% and about 10% by volume of a bromide of a normally gaseous straight-chain paraffinic hydrocarbon, and effecting the reaction at a temperature of between about 100° C. and about 225° C.

6. The process according to claim 5 wherein the saturated aliphatic hydrocarbon and the oxygen are employed in substantially equivolumetric proportions.

7. In a process for the production of desirable oxygenated products, the steps of subjecting vapors of a saturated aliphatic hydrocarbon having at least two carbon atoms per molecule to the action of oxygen in the presence of hydrogen bromide and of between about 0.1% and about 10% by volume of a bromide of a straight-chain paraffinic hydrocarbon, and effecting the reaction at a temperature of between about 100° C. and about 225° C.

8. In a process for the production of desirable oxygenated products, the steps of subjecting vapors of an aromatic hydrocarbon having at least two carbon atoms per molecule to the action of oxygen in the presence of hydrogen bromide and between about 0.1% and about 10% by volume of a bromide of a normally gaseous straight-chain paraffinic hydrocarbon, and effecting the reaction at a temperature of between about 100° C. and about 225° C.

9. In a process for the production of desirable oxygenated products, the steps of subjecting vapors of an alicyclic hydrocarbon having at least two carbon atoms per molecule to the action of oxygen in the presence of hydrogen bromide and between about 0.1% and about 10% by volume of a bromide of a straight-chain paraffinic hydrocarbon, and effecting the reaction at a temperature of between about 100° C. and about 225° C.

10. In a process for the controlled oxidation of organic compounds to produce oxygenated compounds having at least the same number of carbon atoms per molecule as the starting organic compound, the step of subjecting a hydrocarbon, at a temperature of between about 100° C. and the temperature at which spontaneous combustion will occur, to the action of oxygen in the presence of hydrogen bromide and of a minor amount of a bromide of a straight-chain paraffinic hydrocarbon.

11. In a process for the controlled oxidation of organic compounds to produce oxygenated compounds having at least the same number of carbon atoms per molecule as the starting organic compound, the step of subjecting an organic compound having at least one replaceable hydrogen atom, at an elevated temperature below that at which spontaneous combustion and the resultant decomposition of the carbon structure of the starting compound occur, to the action of oxygen in the presence of hydrogen bromide and of a bromide of a straight-chain paraffinic hydrocarbon.

JOHN H. RALEY.
FREDERICK F. RUST.